(12) United States Patent
Son et al.

(10) Patent No.: US 11,066,107 B2
(45) Date of Patent: Jul. 20, 2021

(54) VEHICLE BODY STRUCTURE

(71) Applicants: Hyundai Motor Company, Seoul (KR); Kia Motors Corporation, Seoul (KR)

(72) Inventors: Kyung Hoon Son, Suwon-si (KR); Hyunbin Kim, Hwaseong-si (KR); Jaeha Shim, Seoul (KR); Young Ho Lee, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 133 days.

(21) Appl. No.: 16/374,966

(22) Filed: Apr. 4, 2019

(65) Prior Publication Data

US 2020/0180703 A1      Jun. 11, 2020

(30) Foreign Application Priority Data

Dec. 10, 2018  (KR) .................. 10-2018-0158266

(51) Int. Cl.
*B62D 25/04* (2006.01)
*B62D 25/06* (2006.01)
*B62D 27/02* (2006.01)

(52) U.S. Cl.
CPC ............. *B62D 25/04* (2013.01); *B62D 25/06* (2013.01); *B62D 27/023* (2013.01); *B60Y 2410/124* (2013.01)

(58) Field of Classification Search
CPC ...... B62D 25/04; B62D 25/06; B62D 27/023; B62D 25/00; B60Y 2410/124

USPC ............................................ 296/203.03, 210
See application file for complete search history.

(56) References Cited

U.S. PATENT DOCUMENTS

| 1,737,861 | A | * | 12/1929 | Moesta | B62D 27/023 |
| | | | | | 296/121 |
| 5,018,781 | A | * | 5/1991 | Kumasaka | B62D 25/06 |
| | | | | | 296/193.03 |
| 8,894,136 | B2 | * | 11/2014 | Shono | B62D 25/06 |
| | | | | | 296/210 |
| 9,394,018 | B2 | * | 7/2016 | Kisaku | B62D 65/02 |
| 9,764,770 | B2 | * | 9/2017 | Nakanishi | B62D 25/04 |
| 10,144,455 | B2 | * | 12/2018 | Anegawa | B62D 27/023 |
| 2003/0085593 | A1 | * | 5/2003 | Shuto | B62D 25/02 |
| | | | | | 296/203.01 |

(Continued)

*Primary Examiner* — Dennis H Pedder
*Assistant Examiner* — Joyce Eileen Hill
(74) *Attorney, Agent, or Firm* — Slater Matsil, LLP (57) ABSTRACT

A vehicle body structure may include a front pillar extending in a height direction of a vehicle and positioned in front along a longitudinal direction of the vehicle. A rear pillar extends in the height direction and is positioned in rear along the longitudinal direction of the vehicle. Roof side members extend in the longitudinal direction of the vehicle and are disposed on the left and right sides along a width direction of the vehicle. At least one roof rail extends along the width direction of the vehicle and connecting the roof side members of the left and right sides. The front pillar includes a front pillar inner member and a front pillar outer reinforcing member. A front end portion of the roof side member along the longitudinal direction of the vehicle is inserted between the front pillar inner member the front pillar outer reinforcing member.

20 Claims, 9 Drawing Sheets

(56) References Cited

U.S. PATENT DOCUMENTS

2004/0201253 A1\* 10/2004 Kitagawa ............. B62D 21/157
 296/187.03
2020/0094886 A1\* 3/2020 Otsuka .................... B21D 5/01
2020/0216118 A1\* 7/2020 Marukawa ........... B62D 29/002

\* cited by examiner

VEHICLE BODY STRUCTURE

CROSS-REFERENCE TO RELATED APPLICATIONS

This application claims priority to Korean Patent Application No. 10-2018-0158266, filed in the Korean Intellectual Property Office on Dec. 10, 2018, which application is hereby incorporated herein by reference.

TECHNICAL FIELD

The present invention relates to a vehicle body structure.

BACKGROUND

Generally, an upper part of a vehicle body includes a roof of the vehicle and at least one pillar supporting the roof and being disposed back and forth along the longitudinal direction of the vehicle.

At least one pillar includes, generally, a front pillar disposed forwardly along the longitudinal direction of the vehicle, a rear pillar disposed rearward, and a center pillar disposed between the front pillar and the rear pillar.

An opening and closing door is mounted at the front pillar and the center pillar so as to be rotatable.

Recently, in order to expand the passenger compartment and increase the convenience of getting in and out of the vehicle, a vehicle body structure with an upper vehicle body formed by only the front pillar and the rear pillar without the center pillar has been developed and applied.

However, in such a vehicle body structure, the structural stiffness of the upper vehicle body is inevitably weakened because the center pillar is not used, so that various reinforcing structures have been proposed to compensate for the stiffness weakness of the vehicle body structure and it was necessary to reinforce the rigidity of the upper vehicle body more effectively with fewer parts without increasing the weight and cost.

The above information disclosed in this Background section is only for enhancement of understanding of the background of the invention and therefore it may contain information that does not form the prior art that is already known in this country to a person of ordinary skill in the art.

SUMMARY

The present invention relates to a vehicle body structure. Particular embodiments of the present invention relate to a vehicle body structure capable of constructing a robust upper vehicle body with fewer parts.

Embodiments of the present invention have been made in an effort to provide a vehicle body structure capable of forming a more robust upper vehicle body through the stiffness increase of the members constituting the roof of the vehicle and proper load distribution of the members, and reducing the number of parts, weight and cost.

A vehicle body structure according to an exemplary embodiment of the present invention may include a front pillar extending in a height direction of a vehicle and positioned in front along a longitudinal direction of the vehicle. A rear pillar extends in the height direction of the vehicle and is positioned in rear along the longitudinal direction of the vehicle. Roof side members extend in the longitudinal direction of the vehicle and are disposed on the left and right sides along a width direction of the vehicle. At least one roof rail extends along the width direction of the vehicle and connecting the roof side members of the left and right sides. The front pillar includes a front pillar inner member and a front pillar outer reinforcing member. A front end portion of the roof side member along the longitudinal direction of the vehicle is inserted and coupled between the front pillar inner member the front pillar outer reinforcing member.

The at least one roof rail may include a front roof rail disposed in front along the longitudinal direction of the vehicle; and a center roof rail disposed in the rear of the front roof rail along the longitudinal direction of the vehicle.

The roof side member may be made in a tube shape through hot stamping method.

The center roof rail may be made through cooling press method.

The front pillar inner member may be coupled to a side outer member to form a closed cross-section; and a roof side member may be inserted into the closed cross-section to be coupled to the front pillar inner member.

A stepped portion corresponding to the profile of the side outer member may be formed at an outer side surface of the roof side member along the width direction of the vehicle.

A center pillar extending in the height direction of the vehicle between the front pillar and the rear pillar may be further included.

A stepped portion cutout in the longitudinal direction and the width direction of the vehicle or an oblique cutting portion obliquely cutout with respect to the longitudinal direction and the width direction of the vehicle may be formed at the front pillar outer reinforcing member.

The front pillar inner member and a roof side inner member may be coupled to the inside of the roof side member along the width direction of the vehicle, respectively; a lower gusset may be integrally formed to be protruded to the inside along the width direction of the vehicle at the front pillar inner member and the roof side inner member, respectively; an upper gusset may be overlapped on the lower gusset of the front pillar inner member and the lower gusset of the roof side inner member, respectively; and an end portion of the front roof rail and an end portion of the center roof rail may be fastened to the upper gusset, respectively.

The upper gusset fastened to the center roof rail may be attached on one side surface of the roof side member; and the roof side inner member may be attached on the other side surface of the roof side member.

The upper gusset fastened to the center roof rail may be disposed above the roof side inner member in the height direction of the vehicle; and an end portion of the roof side inner member may be disposed gradually away from the upper gusset toward the outside of the width direction of the vehicle, so that a closed cross-section is formed between the upper gusset, the roof side inner member and the roof side member.

A rigid foam made of composite material may be inserted into the inside of the roof side member.

A center pillar extending in the height direction of the vehicle and being disposed between the front pillar and the rear pillar may be further included; and one end portion of the roof side member may be coupled to the front pillar and the other end portion thereof is coupled to the center pillar.

In accordance with the vehicle body structure according to an exemplary embodiment of the present invention, the center roof rail is formed of a panel shape by cold pressing method and the roof side member is formed of a tube shape by hot pressing method to couple with each other, so that the weight and the number of parts of the upper vehicle body can be reduced and the rigidity can be increased.

The coupling portion of the roof side member and the front roof rail and the center roof rail is formed with a closed cross-section, so that the rigidity of the roof and load supporting performance can be improved.

A diagonal cutting portion is applied to the front pillar outer reinforcing panel to which the roof side member is coupled, it is possible to reduce the possibility of breakage due to external impact loads at the coupling portion between the roof side member and the front pillar outer reinforcing panel by preventing sudden stiffness change.

The profile of the roof side member is made of a shape similar to the profile of the side outer panel coupled to an outside thereof, thereby increasing the rigidity of the roof.

A foamed rigid foam is inserted into a closed cross-section of the roof side member, so that the entire or partial rigidity of the roof side member is increased and it is possible to prevent the buckling of the roof side member in the event of a frontal collision or an offset collision of the vehicle, thereby increasing the rigidity against collision.

The following reference symbols can be used in conjunction with the drawings.

1: front pillar
2: rear pillar
3: center pillar
11: front pillar inner member
12: front pillar outer reinforcing member
31: roof side member
32: front roof rail
33: center roof rail
34: side outer member
35: roof side inner member:
40: upper gusset
50: closed cross-section
60: a rigid foam

DETAILED DESCRIPTION OF ILLUSTRATIVE EMBODIMENTS

Hereinafter, an exemplary embodiment of the present invention will be described in detail with reference to accompanying drawing.

Figure 1:
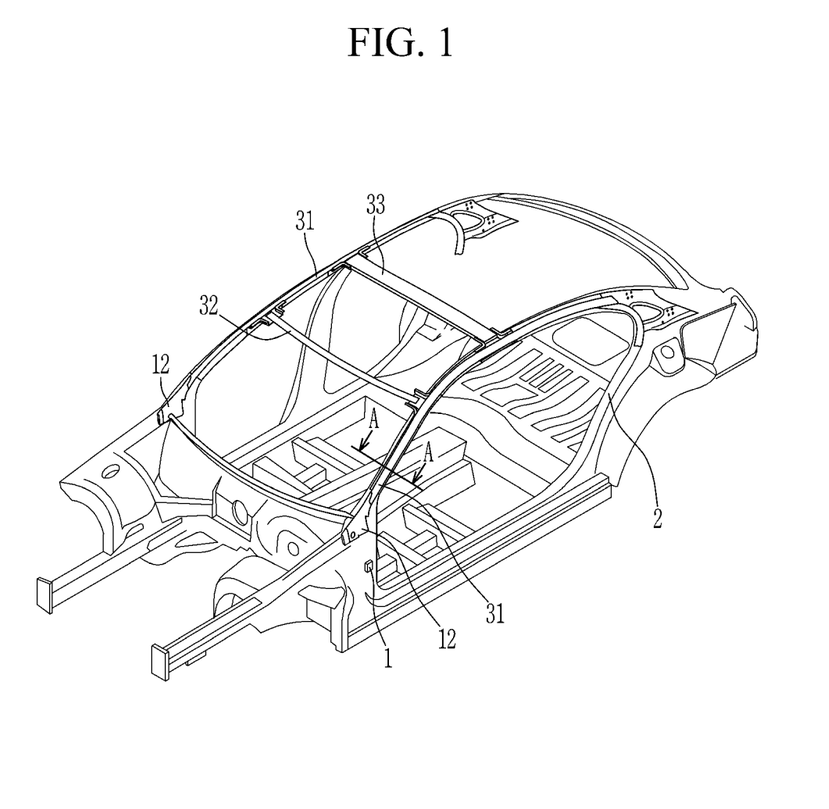
FIG. 1 is a perspective view of a vehicle body structure according to an exemplary embodiment of the present invention.
Figure 2:
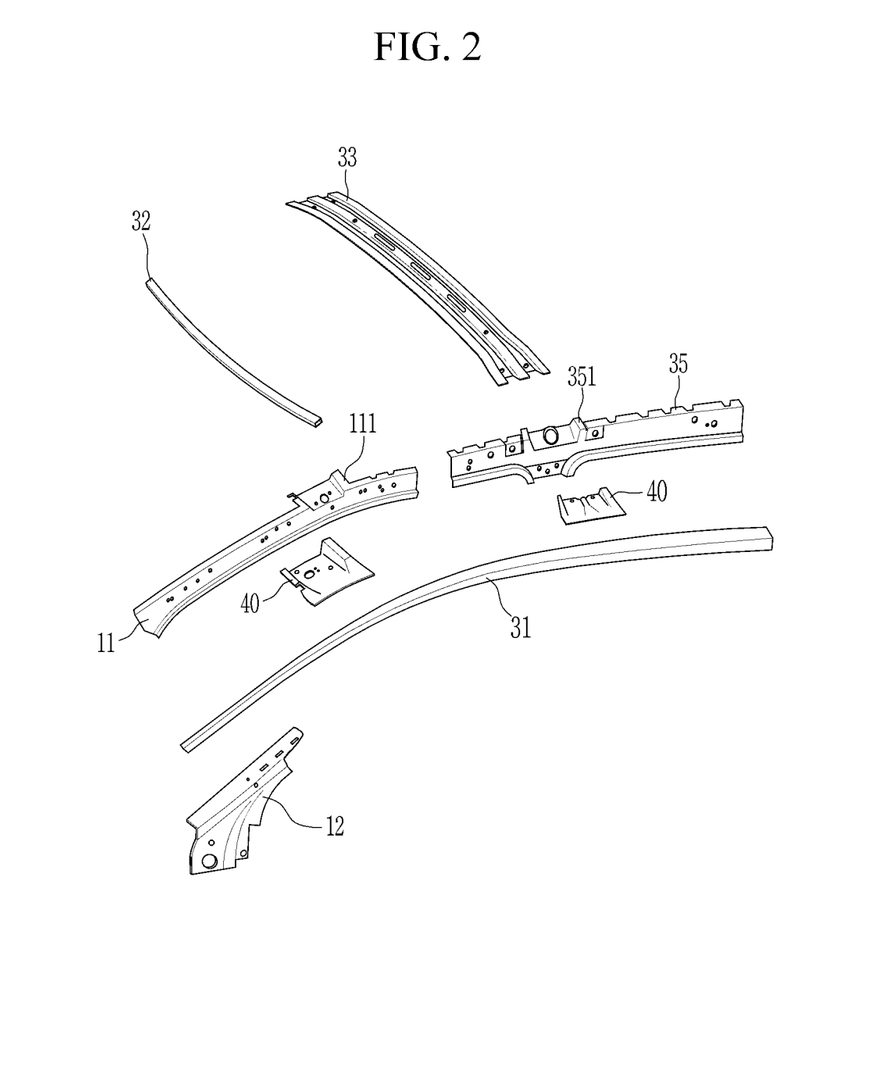
FIG. 2 is an exploded perspective view of the vehicle body structure according to the exemplary embodiment of the present invention.

Referring to FIGS. 1 and 2, a vehicle body structure according to an exemplary embodiment of the present invention may include a front pillar 1 extending in the height direction of a vehicle and positioned in front along the longitudinal direction of the vehicle and a rear pillar 2 positioned in the rear.

Further, a roof of the vehicle may include roof side members 31 extended in the longitudinal direction of the vehicle to be coupled with the front pillar 1 and the rear pillar 2 and disposed on the left and right sides along the width direction of the vehicle, a front roof rail 32 disposed in the front and a center roof rail 33 disposed in the rear along the longitudinal direction of the vehicle, which are extended along the width direction of the vehicle to connect the roof side member 31 of left and right sides, respectively. The center roof rail 33 may be made by cooling press method.

A front end portion of the roof side member 31 along the longitudinal direction of the vehicle may be inserted and coupled between a front pillar inner member 11 and a front pillar outer reinforcing member 12 to be connected with the front pillar 1 and a rear end portion thereof may be connected with the rear pillar 2.

Figure 3:
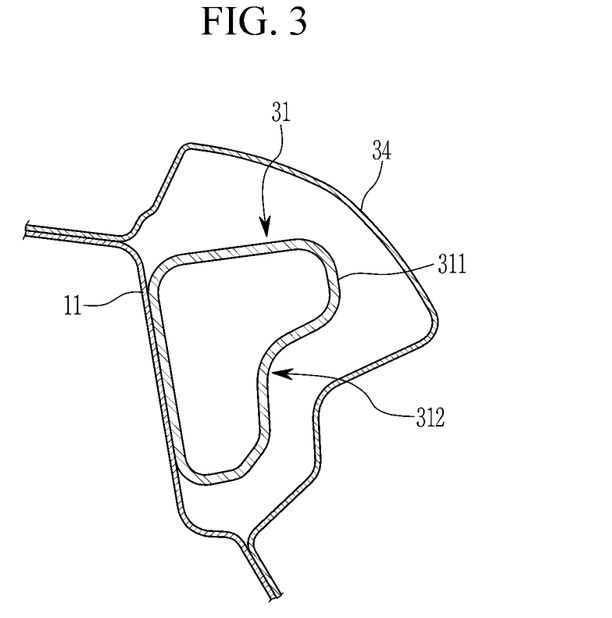
FIG. 3 is a cross-sectional view taken along the line A-A of FIG. 1.

Referring to FIG. 3, a side outer member 34 may be coupled to the front pillar inner member 11 to form a closed cross-section, and the roof side member 31 may be inserted into the closed cross-section to be coupled with the front pillar inner member 11 by welding, and so on.

The roof side member 31 may be preferably made in a tube shape through hot stamping method.

A stepped portion 312 may be formed at an outer side surface 311 of the roof side member 31 along the width direction of the vehicle and the outer side surface 311 of the roof side member 31 may be formed to be substantially similar to the outer side profile of the side outer member 34.

Thus, when the profile of the outer side surface 311 of the roof side member 31 is formed to be approximately the same as or similar to the outer profile of the side outer member 34, the spacing between the outer side surface 311 of the roof side member 31 and the side outer member 34 is substantially the same, thereby increasing the rigidity of the roof side of the vehicle.

Figure 4:
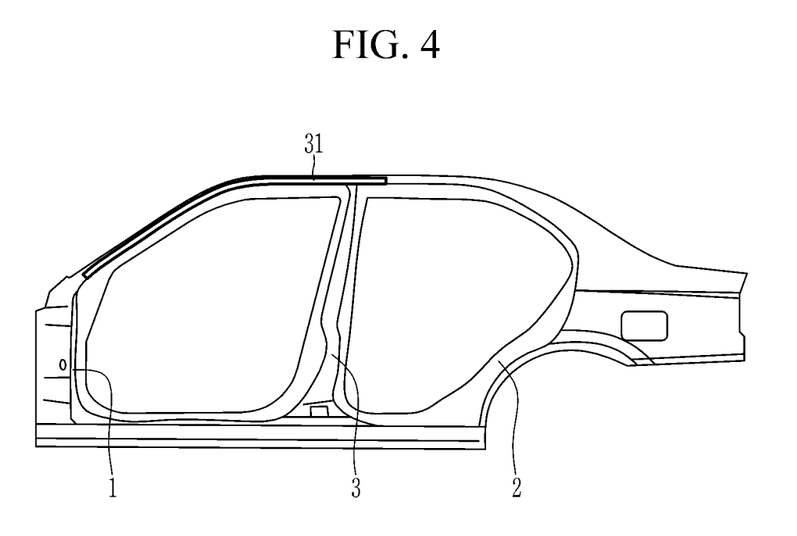
FIG. 4 is a side view of the case where the vehicle body structure of the exemplary embodiment of the present invention is applied to the vehicle body to which a center pillar is applied.

On the other hand, as shown in FIG. 4, in a case that a center pillar 3 is applied to the vehicle, the roof side member 31 made by hot stamping method can be applied to only the section between the front pillar 1 and the center pillar 3.

Figure 5:
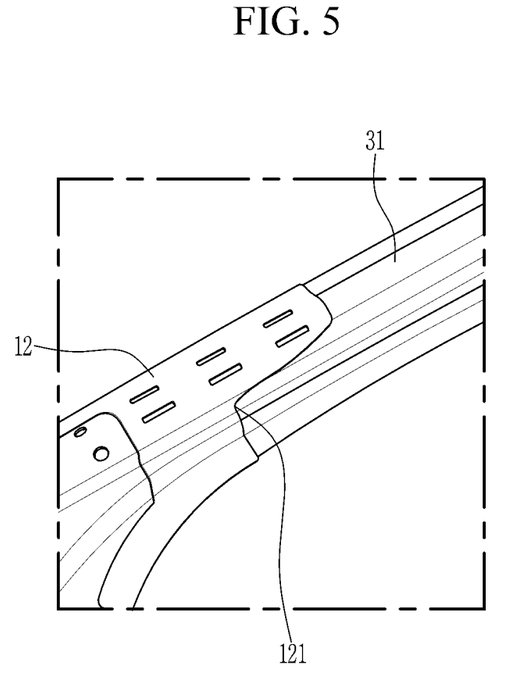
FIG. 5 is an enlarged view of a coupling portion between a front pillar and a roof side member in the vehicle body structure according to the exemplary embodiment of the present invention.
Figure 6:
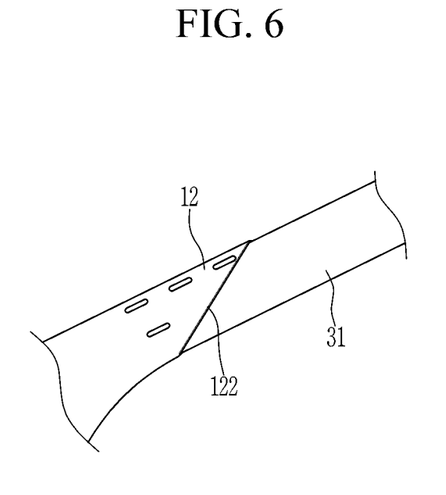
FIG. 6 is an enlarged view of a coupling portion between a front pillar and a roof side member in the vehicle body structure according to another exemplary embodiment of the present invention.

Referring to FIG. 5, when the front end portion of the roof side member 31 along the longitudinal direction of the vehicle is inserted and coupled between the front pillar inner member 11 and the front pillar outer reinforcing member 12 to be connected with the front pillar 1, a stepped portion 121 cut out along the longitudinal direction and the width direction of the vehicle may be formed at the front pillar outer reinforcing member 12 or, as shown in FIG. 6, an oblique cutout portion 122 cut out in the oblique direction with respect to the longitudinal direction and the width direction of the vehicle may be provided.

When the stepped portion 121 or the oblique cutout portion 122 is formed at front pillar outer reinforcing member 12 as like this, the stiffness of the coupling portion between the front pillar outer reinforcing member 12 and the roof side member 31 is smoothly changed so that when the collision impact is transmitted to the coupling portion in the event of vehicle collision, it is possible to reduce the possibility of collision breakage effectively through smooth stiffness change.

Referring to FIG. 2 again, the front pillar inner member 11 and a roof side inner member 35 may be coupled to the inside of the roof side member 31 along the width direction of the vehicle, respectively, and lower gussets 111 and 351 may be integrally formed at the front pillar inner member 11 and the roof side inner member 35 to be protruded toward the width direction of the vehicle, respectively.

Further, an upper gusset 40 overlapped over the lower gussets 111 and 351 may be made as separate product.

Figure 7:
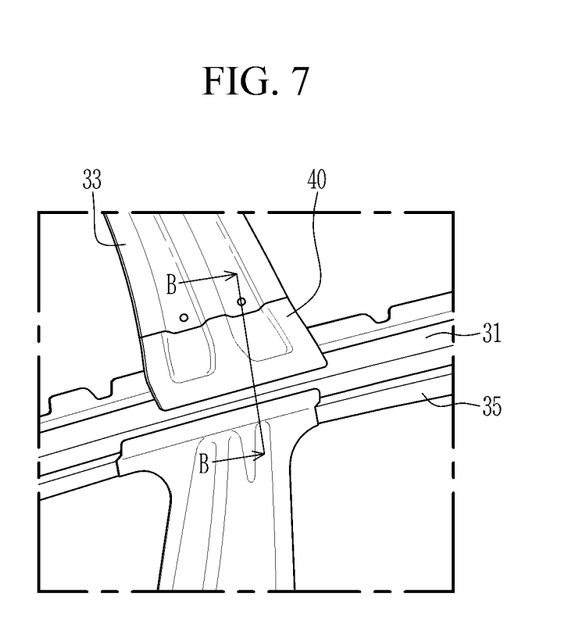
FIG. 7 is perspective view of a coupling portion between a center roof rail and the roof side member in the vehicle body structure according to the exemplary embodiment of the present invention.
Figure 8:
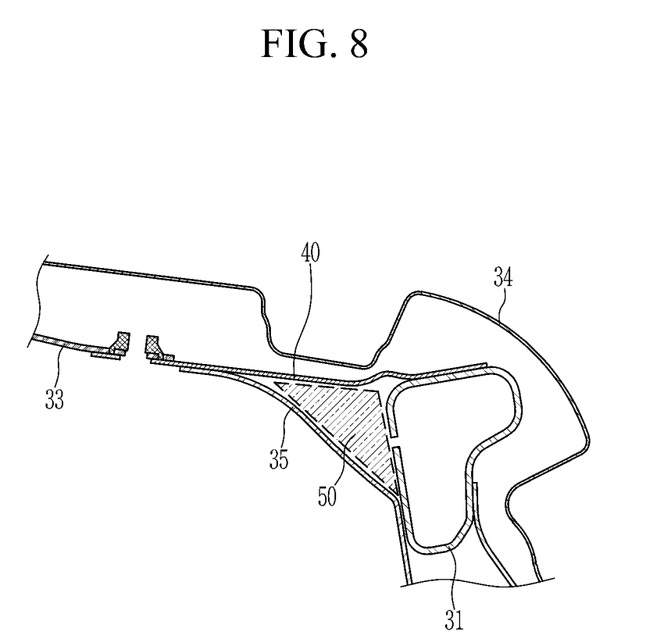
FIG. 8 is a cross-sectional view taken along the line B-B in FIG. 7.

Referring to FIGS. 7 and 8, FIG. 7 shows the structure that the center roof rail 33 is coupled to the roof side member 31. Since the structure that the front roof rail 32 is coupled with the roof side member 31 is the same, a description thereof will be omitted.

First, an end portion of the center roof rail 33 may be fastened to one end portion of the upper gusset 40 via bolts, the other end of the upper gusset 40 is closely attached on one side surface the roof side member 31 be welding, and so on, one end portion of the lower gusset 351 is coupled to a lower surface of the one end portion of the upper gusset 40 by welding, and so on, and the other end portion of the lower gusset 351 and an end portion of the roof side inner member 35 are closely attached on the other end surface of the roof side member 31 by welding and so on.

Herein, the upper gusset 40 may be disposed above the roof side inner member 35 along the height direction of the vehicle, and an end portion of the roof side inner member 35 may be gradually spaced from the upper gusset 40 toward the outside in the width direction of the vehicle, so that a closed cross-section of a generally triangle shape is formed between the upper gusset 40, the roof side inner member 35 and the roof side member 31. The closed cross-section increases the stiffness of coupling portion between the center roof rail 33, the roof side member 31 and the roof side inner member 35 so that the stiffness of the roof of the vehicle is increased, thereby improving the collision response of the vehicle.

Figure 9:
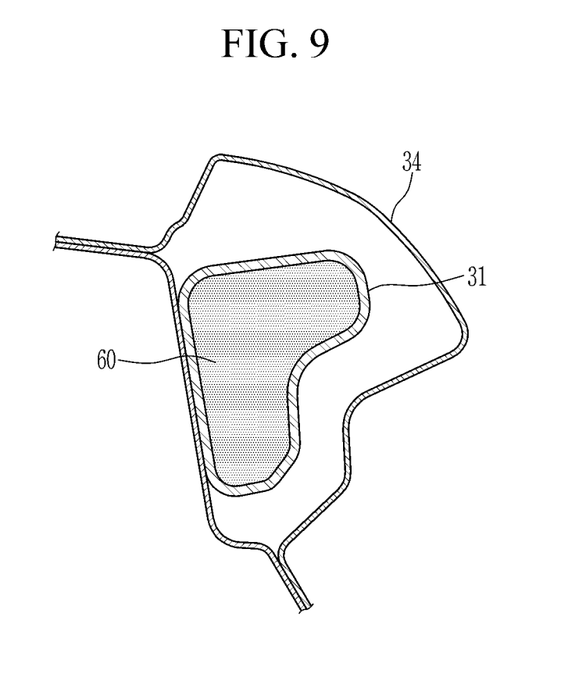
FIG. 9 is a cross-sectional view of a roof side member according to another exemplary embodiment in the vehicle body structure according to the exemplary embodiment of the present invention.

On the other hand, as shown in FIG. 9, a rigid foam 60 made of a composite material may be inserted into the roof side member 31 so that the stiffness of the roof side member 31 can be increased. The rigid foam 60 can be inserted into and coupled to the entire roof side member 31, but partially inserted into only the relative rigid weak portion of the roof side member 31, e.g., the portion where the roof side member 31 is curved to form the front window so that the relative rigidity weaken portion of the roof side member 31 can be reinforced.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A vehicle body structure comprising:
   a front pillar extending in a height direction of a vehicle and positioned in front along a longitudinal direction of the vehicle, wherein the front pillar includes a front pillar inner member and a front pillar outer reinforcing member, wherein the front pillar inner member is coupled to a side outer member to define a closed cross-section;
   a rear pillar extending in the height direction of the vehicle and positioned in rear along the longitudinal direction of the vehicle;
   a roof side member extending in the longitudinal direction of the vehicle, wherein a front end portion of the roof side member along the longitudinal direction of the vehicle is inserted and coupled between the front pillar inner member and the front pillar outer reinforcing member, wherein the roof side member is inserted into the closed cross-section to be coupled to the front pillar inner member;
   a front roof rail disposed in the front along the longitudinal direction of the vehicle;
   a center roof rail disposed behind the front roof rail along the longitudinal direction of the vehicle; and
   a further roof side member extending in the longitudinal direction of the vehicle, the roof side member and the further roof side member disposed on left and right sides along a width direction of the vehicle; and
   wherein the front pillar inner member and a roof side inner member are coupled to the inside of the roof side member along a width direction of the vehicle, respectively;
   wherein a lower gusset is integrally formed to be protruded to the inside along the width direction of the vehicle at the front pillar inner member and the roof side inner member, respectively;
   wherein an upper gusset is overlapped on the lower gusset of the front pillar inner member and the lower gusset of the roof side inner member, respectively; and
   wherein an end portion of the front roof rail and an end portion of the center roof rail are fastened to the upper gusset, respectively.

2. The vehicle body structure of claim 1, further comprising a rigid foam comprising a composite material disposed inside the roof side member.

3. The vehicle body structure of claim 2, further comprising a center pillar extending in the height direction of the vehicle and being disposed between the front pillar and the rear pillar.

4. A vehicle body structure comprising:
   a front pillar extending in a height direction of a vehicle and positioned in front along a longitudinal direction of the vehicle, wherein the front pillar includes a front pillar inner member and a front pillar outer reinforcing member, wherein the front pillar inner member is coupled to a side outer member to define a closed cross-section;
   a rear pillar extending in the height direction of the vehicle and positioned in rear along the longitudinal direction of the vehicle;
   a roof side member extending in the longitudinal direction of the vehicle, wherein a front end portion of the roof side member along the longitudinal direction of the vehicle is inserted and coupled between the front pillar inner member and the front pillar outer reinforcing member, wherein the roof side member is inserted into the closed cross-section to be coupled to the front pillar inner member;
   a front roof rail disposed in the front along the longitudinal direction of the vehicle; and a center roof rail disposed behind the front roof rail along the longitudinal direction of the vehicle;

wherein the front pillar inner member and a roof side inner member are coupled to the inside of the roof side member along a width direction of the vehicle, respectively;

wherein a lower gusset is integrally formed to be protruded to the inside along the width direction of the vehicle at the front pillar inner member and the roof side inner member, respectively;

wherein an upper gusset is overlapped on the lower gusset of the front pillar inner member and the lower gusset of the roof side inner member, respectively; and wherein an end portion of the front roof rail and an end portion of the center roof rail are fastened to the upper gusset, respectively.

5. The vehicle body structure of claim 4, wherein a stepped portion corresponding to the profile of the side outer member is formed at an outer side surface of the roof side member along the width direction of the vehicle.

6. The vehicle body structure of claim 5, wherein the stepped portion is not exposed to the outside of the vehicle.

7. The vehicle body structure of claim 5, wherein the stepped portion is isolated from the outside of the vehicle by the side outer member and the front pillar inner member.

8. The vehicle body structure of claim 4, further comprising a center pillar extending in the height direction of the vehicle between the front pillar and the rear pillar.

9. The vehicle body structure of claim 4, wherein a stepped portion cutout in the longitudinal direction and the width direction of the vehicle is formed at the front pillar outer reinforcing member.

10. The vehicle body structure of claim 4, wherein an oblique cutting portion obliquely cut out with respect to the longitudinal direction and the width direction of the vehicle is formed at the front pillar outer reinforcing member.

11. The vehicle body structure of claim 4, wherein a first end portion of the roof side member is coupled to the front pillar and a second end portion of the roof side member is coupled to a center pillar extending in the height direction of the vehicle between the front pillar and the rear pillar.

12. The vehicle body structure of claim 4, wherein the roof side member has a tube shape.

13. The vehicle body structure of claim 12, wherein the roof rail are formed using a cooling press method.

14. The vehicle body structure of claim 12, wherein the roof side member is formed using a hot stamping method.

15. The vehicle body structure of claim 4, wherein:
the upper gusset fastened to the center roof rail is attached on a first side surface of the roof side member; and
the roof side inner member is attached on a second side surface of the roof side member.

16. The vehicle body structure of claim 15, wherein:
the upper gusset fastened to the center roof rail is disposed above the roof side inner member in the height direction of the vehicle; and an end portion of the roof side inner member is disposed gradually away from the upper gusset toward the outside in the width direction of the vehicle, so that a second closed cross-section is formed between the upper gusset, the roof side inner member and the roof side member.

17. The vehicle body structure of claim 4, wherein the roof side member is coupled to the front pillar inner member by a welding process.

18. A vehicle body structure comprising:
a front pillar extending in a height direction of a vehicle and positioned in front along a longitudinal direction of the vehicle, wherein the front pillar includes a front pillar inner member and a front pillar outer reinforcing member, wherein the front pillar inner member is coupled to a side outer member to define a closed cross-section;
a rear pillar extending in the height direction of the vehicle and positioned in rear along the longitudinal direction of the vehicle;
a roof side member extending in the longitudinal direction of the vehicle, wherein a front end portion of the roof side member along the longitudinal direction of the vehicle is inserted and coupled between the front pillar inner member and the front pillar outer reinforcing member, wherein the roof side member is inserted into the closed cross-section to be coupled to the front pillar inner member;
a rigid foam comprising a composite material disposed inside the roof side member;
a front roof rail disposed in the front along the longitudinal direction of the vehicle; and
a center roof rail disposed behind the front roof rail along the longitudinal direction of the vehicle;
wherein the front pillar inner member and a roof side inner member are coupled to the inside of the roof side member along a width direction of the vehicle, respectively;
wherein a lower gusset is integrally formed to be protruded to the inside along the width direction of the vehicle at the front pillar inner member and the roof side inner member, respectively;
wherein an upper gusset is overlapped on the lower gusset of the front pillar inner member and the lower gusset of the roof side inner member, respectively; and
wherein an end portion of the front roof rail and an end portion of the center roof rail are fastened to the upper gusset, respectively.

19. The vehicle body structure of claim 18, wherein a stepped portion corresponding to the profile of the side outer member is formed at an outer side surface of the roof side member along the width direction of the vehicle.

20. The vehicle body structure of claim 18, further comprising a center pillar extending in the height direction of the vehicle between the front pillar and the rear pillar.

* * * * *